(12) United States Patent
Huo et al.

(10) Patent No.: US 12,666,084 B2
(45) Date of Patent: Jun. 23, 2026

(54) METHOD FOR APPLYING VIDEO ENCODING TECHNIQUES IN SCANNER REDIRECTION

(71) Applicant: Omnissa, LLC, Mountain View, CA (US)

(72) Inventors: Huiyong Huo, Beijing (CN); Zhongzheng Tu, Beijing (CN); Mingsheng Zang, Beijing (CN); Kai Xiang, Beijing (CN); Ning Ge, Beijing (CN); Tao Jin, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 203 days.

(21) Appl. No.: 18/531,492

(22) Filed: Dec. 6, 2023

(65) Prior Publication Data

US 2025/0133237 A1     Apr. 24, 2025

(30) Foreign Application Priority Data

Oct. 19, 2023    (WO) ................ PCT/CN2023/125315

(51) Int. Cl.
*H04N 19/70* (2014.01)
*H04N 19/172* (2014.01)
(52) U.S. Cl.
CPC ........... *H04N 19/70* (2014.11); *H04N 19/172* (2014.11)
(58) Field of Classification Search
CPC ............................. H04N 19/70; H04N 19/172
See application file for complete search history.

(56) References Cited

U.S. PATENT DOCUMENTS

| | | | | |
|---|---|---|---|---|
| 11,704,634 | B1 * | 7/2023 | Medina, III | ........... G06V 40/33 |
| | | | | 705/45 |
| 11,716,428 | B1 | 8/2023 | Tu | |
| 11,750,749 | B1 | 9/2023 | Tu | |
| 2006/0070090 | A1 * | 3/2006 | Gulkis | ............... H04N 1/00236 |
| | | | | 719/328 |
| 2006/0222065 | A1 * | 10/2006 | Ramakrishnan | ....... H04N 19/61 |
| | | | | 375/E7.125 |
| 2006/0256858 | A1 * | 11/2006 | Chin | .................... H04N 19/176 |
| | | | | 375/E7.157 |

(Continued)

OTHER PUBLICATIONS

"Document Scanner—Twain, WIA, ISIS or SANE," Jan. 7, 2020, Dynamsoft, 5 pages,. https://www.dynamsoft.com/blog/insights/document-scanning-twain-wia-isis-sane.

(Continued)

*Primary Examiner* — Fabio S Lima
(74) *Attorney, Agent, or Firm* — Kim & Stewart LLP

(57) ABSTRACT

A scanner redirection method for a remote desktop computer system, wherein the remote desktop computer system includes a client computer and a remote computer, includes the steps of: transmitting at least one request to the client computer to acquire one or more first images from an image capturing device connected to the client computer; upon receiving a compressed video file that was created by the client computer in response to the at least one request and that was then transmitted by the client computer, applying a video decoding algorithm to expand the compressed video file into a decompressed video file having one or more second images; and providing each of the one or more second images to an application running in the remote computer.

20 Claims, 7 Drawing Sheets

(56)        References Cited

U.S. PATENT DOCUMENTS

| | | | |
|---|---|---|---|
| 2007/0211310 A1* | 9/2007 | Kadota | H04N 1/32507 358/474 |
| 2008/0297812 A1* | 12/2008 | Watanabe | H04N 1/00411 358/1.9 |
| 2009/0080035 A1* | 3/2009 | Downs | H04N 1/047 358/473 |
| 2009/0091555 A1* | 4/2009 | Do | G06F 3/04883 345/175 |
| 2011/0055765 A1* | 3/2011 | Neubrand | H04N 1/32122 713/400 |
| 2012/0128058 A1* | 5/2012 | Bakharov | H04N 21/85406 375/E7.026 |
| 2013/0198462 A1 | 8/2013 | Serlet | |
| 2016/0198081 A1 | 7/2016 | Thomas | |
| 2017/0127095 A1 | 5/2017 | Park | |
| 2018/0234517 A1* | 8/2018 | Venkatesh | H04L 67/563 |
| 2021/0092238 A1* | 3/2021 | Gill | H04N 1/00244 |

OTHER PUBLICATIONS

Non-Final Office Action dated Oct. 22, 2025 in related U.S. Appl. No. 18/508,121.

* cited by examiner

Scanner Redirection Client Plugin          Image Capture Core

METHOD FOR APPLYING VIDEO ENCODING TECHNIQUES IN SCANNER REDIRECTION

CROSS-REFERENCE

This application is based upon and claims the benefit of priority from International Patent Application No. PCT/CN2023/125315, filed on Oct. 19, 2023, the entire contents of which are incorporated herein by reference.

BACKGROUND

Many organizations rely on remote desktop (RD) services to provide lean, flexible computing environments. Scanner redirection is an important feature required by such organizations. Through scanner redirection, applications on remote computers acquire images from image capturing devices (ICDs) that are connected to separate client computers, i.e., ICDs that are not directly connected to the remote computers. Specifically, the remote computers transmit requests for images to the client computers. In response, the client computers acquire images from the ICDs and transmit them to the remote computers.

Because scanner redirection involves client computers transmitting images to remote computers, scanner redirection consumes bandwidth of networks between the client and remote computers. Accordingly, especially when scanner redirection is used by the remote computers to acquire large numbers of images, the transmission of image data causes congestion on the networks. A method is thus desired for acquiring images through scanner redirection in a manner that minimizes the burden placed on networks.

SUMMARY

Accordingly, one or more embodiments provide for an RD computer system, wherein the RD computer system includes a client computer and a virtual machine (VM) of a remote computer, i.e., a remote VM. The client computer includes image capturing software that is configured to communicate with ICDs. According to a first embodiment, the image capturing software includes a "data source," which is a component that communicates with the ICDs, e.g., to acquire images therefrom. According to a second embodiment, the image capturing software is an image capture core, which is a service running in an operating system (OS) that exposes application programming interfaces (APIs) for communicating with the ICDs. According to a third embodiment, the image capturing software is a scanner-access-now-easy (SANE) module that similarly exposes APIs for communicating with the ICDs.

One or more embodiments provide a scanner redirection method for an RD computer system. The RD computer system includes a client computer and a remote computer. The scanner redirection method includes the steps of: transmitting at least one request to the client computer to acquire one or more first images from an ICD connected to the client computer; upon receiving a compressed video file that was created by the client computer in response to the at least one request and that was then transmitted by the client computer, applying a video decoding algorithm to expand the compressed video file into a decompressed video file having one or more second images; and providing each of the one or more second images to an application running in the remote computer.

Further embodiments include a non-transitory computer-readable storage medium comprising instructions that cause an RD computer system to carry out the above scanner redirection method, as well as an RD computer system configured to carry out the above scanner redirection method.

DETAILED DESCRIPTION

Techniques are described for realizing scanner redirection during an RD session between a client computer and a remote VM. The remote VM executes an application that consumes images from ICDs, and the ICDs are connected to the client computer. To acquire images from an ICD, the application of the remote VM requests the images from the client computer. The client computer then acquires the images from the ICD and transmits them to the remote VM as a compressed video file.

According to a first embodiment, the client computer and the remote VM utilize the same scanning protocol such as the TWAIN protocol. Pursuant to the common scanning protocol, applications of the client computer and remote VM utilize "data source managers" and "data sources." For the remote VM, the data source manager communicates with a "virtual" data source, the virtual data source requesting images from the client computer. For the client computer, the data source manager communicates with a data source that acquires images from ICDs.

According to other embodiments, the client computer has a different OS than that of the remote VM. As a result, the client computer uses one scanning protocol such as the Image Capture (ICA) Framework or the SANE API, and the remote VM uses another scanning protocol such as the TWAIN protocol. Pursuant to its respective scanning protocol, the remote VM still utilizes a data source manager and virtual data source. Pursuant to the other scanning protocol, the client computer utilizes a separate component that communicates directly with ICDs (not through a separate data source component) to acquire images.

According to techniques, when the client computer acquires one or more images, the client computer first applies a video encoding algorithm (e.g., H.264 encoding) to the image(s). By applying the video encoding algorithm, the client computer compresses the image(s) to create a single video file. The client computer then transmits the video file to the remote VM instead of separately transmitting images in the form received from an ICD. The remote computer then applies a video decoding algorithm (e.g., H.264 decoding) to expand the video file into at least an approximation(s) of the original image(s).

For a variety of video encoding algorithms, the video file is significantly smaller than the totality of any constituent images, especially for large numbers of images. For example, ten joint photographic experts group (JPEG) images may combine to be thousands of kilobytes in size, and they may be compressed into a video file that is hundreds of kilobytes in size. Accordingly, by only transmitting a compressed video file from the client computer to the remote VM, techniques significantly reduce the bandwidth consumption for scanner redirection. These and further aspects of the invention are discussed below with respect to the drawings.

Figure 1:
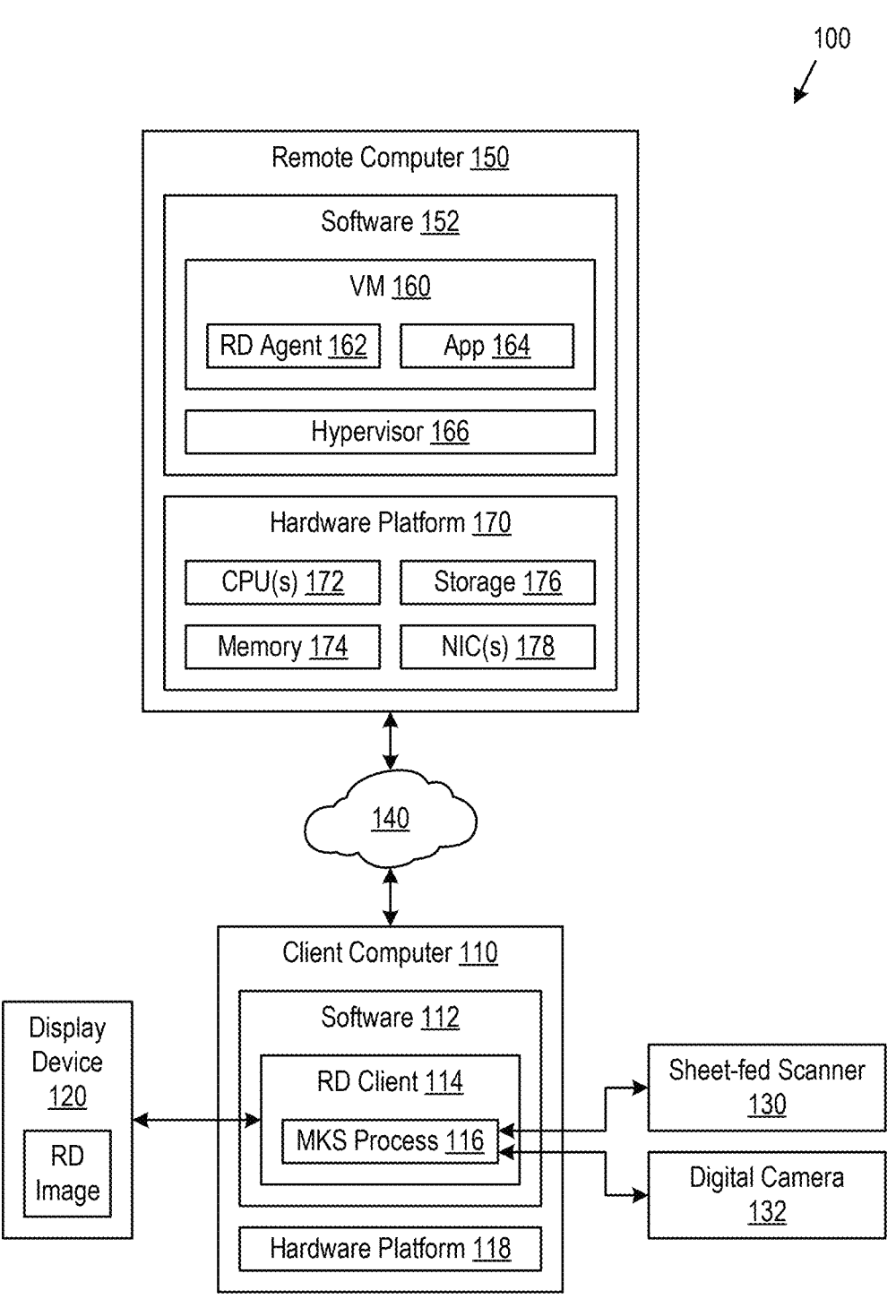
FIG. 1 is a block diagram of an RD computer system in which embodiments may be implemented.

FIG. 1 is a block diagram of an RD computer system 100 in which embodiments may be implemented. RD computer system 100 includes a client computer 110 and a remote computer 150 (remote from client computer 110). For example, client computer 110 may be a laptop, desktop computer, or server in a private data center controlled by a particular organization. Remote computer 150 may be a server provisioned in a private data center controlled by the particular organization or a server provisioned in a public data center that includes servers of other organizations.

Client computer 110 is constructed on a hardware platform 118 such as an x86 architecture platform. Hardware platform 118 includes conventional components of a computing device (not shown), such as one or more central processing units (CPUs), memory such as random-access memory (RAM), local storage such as one or more magnetic drives or solid-state drives (SSDs), and one or more network interface cards (NICs). The NIC(s) enable client computer 110 to communicate with remote computer 150 over a network 140 such as the Internet.

Hardware platform 118 supports software 112, which includes an RD client application 114 running on a commodity OS (not shown). For example, RD client 114 may be VMware Horizon® Client, available from VMware, Inc. The term "desktop" in remote desktop (RD) refers to an instance of an interactive environment provided by an OS and software applications, typically in the form of display and sound output and keyboard and mouse input. Through RD client 114, a user accesses RDs from any location.

RD client 114 includes a mouse, keyboard, screen (MKS) process 116, which receives images of an RD from remote computer 150. When MKS process 116 receives RD images, RD client 114 communicates with a display device 120 such as a monitor on which the user views the RD images. When the user performs actions in the RD such as clicking a computer mouse or typing on a keyboard, the user's actions are received by MKS process 116. MKS process 116 transmits the user's actions to remote computer 150 to update the RD accordingly.

Remote computer 150 is constructed on a hardware platform 170 such as an x86 architecture platform. Hardware platform 170 includes the conventional components of a computing device discussed above with respect to hardware platform 118, including a CPU(s) 172, memory 174, local storage 176, and a NIC(s) 178. CPU(s) 172 are configured to execute instructions such as executable instructions that perform one or more operations described herein, which may be stored in memory 174. NIC(s) 178 enable remote computer 150 to communicate with client computer 110 over network 140.

Hardware platform 170 supports software 152. Software 152 includes a hypervisor 166, which is a virtualization software layer. Hypervisor 166 supports a VM execution space in which VMs such as a VM 160 are concurrently instantiated and executed. For example, hypervisor 166 may be a VMware ESX® hypervisor, available from VMware, Inc.

In embodiments illustrated herein, an RD is running in VM 160. The RD is accessible through an RD session between client computer 110 and VM 160. VM 160 includes an RD agent application 162 and an application 164. RD agent 162 hosts the RD and periodically transmits an updated image of the RD to RD client 114.

RD client 114 is configured to execute a scanning protocol such as the TWAIN protocol, the ICA framework, or the SANE API. According to any of such scanning protocols, RD client 114 acquires images from two ICDs connected to client computer 110: a sheet-fed scanner 130 and a digital camera 132. To do so, RD client 114 communicates with drivers (not shown) installed in software 112 to control the ICDs. RD client 114 transmits images to RD agent 162 of VM 160 as a compressed video file, as discussed further below.

Application 164 consumes images created by the ICDs connected to client computer 110. Application 164 is modified to handle scanner redirection. For example, application 164 may be a modified version of Adobe® Photoshop.® A particular configuration of RD computer system 100 is illustrated in FIG. 1. However, it should be recognized that one or more embodiments may be practiced with other computer system configurations.

Figure 2:
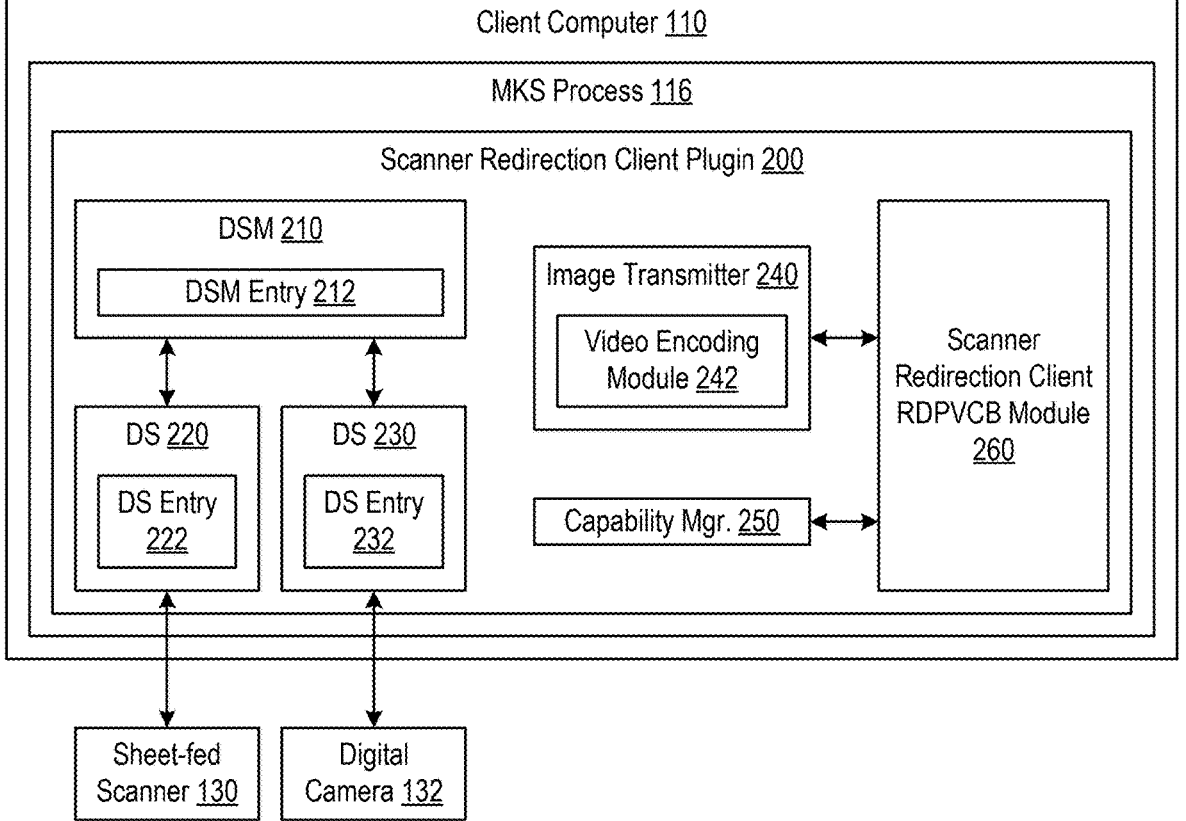
FIG. 2 is a block diagram of a client computer of the RD computer system and a group of ICDs connected to the client computer, according to a first embodiment.

FIG. 2 is a block diagram of client computer 110 and ICDs 130 and 132 connected thereto, according to the first embodiment. According to the first embodiment, client computer 110 uses the same scanning protocol as VM 160, e.g., the TWAIN protocol. In the example of FIG. 2, there are two drivers (not shown) installed in client computer 110 for controlling the depicted ICDs, one for controlling sheet-fed scanner 130 and one for controlling digital camera 132.

MKS process 116 includes a scanner redirection client plugin 200, which interacts with the ICDs, e.g., to acquire images. Scanner redirection client plugin 200 includes a data source manager (DSM) 210 that communicates with data sources (DSs) 220 and 230. DS 220 communicates with a driver to control sheet-fed scanner 130, and DS 230 communicates with another driver to control digital camera 132. To communicate with ICDs, scanner redirection client plugin 200 calls a "DSM entry" function 212 to provide commands to DSM 210. DSM 210 then calls a "DS entry" function 222 or 232 to transmit commands to DS 220 or 230, respectively. The relevant DS then returns results to DSM 210 via return values of the DS entry call. Similarly, DSM 210 returns results to scanner redirection client plugin 200 via DSM entry 212 return values.

Scanner redirection client plugin 200 also includes an image transmitter 240, a capability manager 250, and a scanner redirection client remote desktop protocol virtual channel bridge (RDPVCB) module 260, referred to herein as client RDPVCB module 260. Client RDPVCB module 260 is communication software that is configured to communicate with VM 160 via transmission control protocol (TCP) or user datagram protocol (UDP) channels. Such channels are established between client RDPVCB module 260 and communication software of VM 160, as discussed further below. Client RDPVCB module 260 is also configured to communicate with image transmitter 240 and capability manager 250.

When one of the DSs acquires one or more images from a corresponding ICD, scanner redirection client plugin 200 instructs image transmitter 240 to transmit the image(s) to VM 160 via client RDPVCB module 260. Image transmitter 240 uses a video encoding module 242 to apply a video encoding algorithm to the image(s) to compress the image(s) to a single video file. Image transmitter 240 may also optionally use a threshold parameter (not shown), which is a minimum number of images for applying video encoding. If the total amount of images acquired from an ICD is less than that threshold, image transmitter 240 transmits the image(s) to VM 160 without applying video encoding. Otherwise, if greater than or equal to the threshold, image transmitter 240 applies video encoding.

Additionally, one of the DSs may acquire capabilities from a corresponding ICD such as different supported resolutions for acquired images. Scanner redirection client plugin 200 instructs capability manager 250 to transmit the capabilities to VM 160 via client RDPVCB module 260. If the user specifies to adjust settings for a particular ICD, scanner redirection client plugin 200 instructs the corresponding DS via DSM 210 to control the ICD to adjust those settings.

Figure 3:
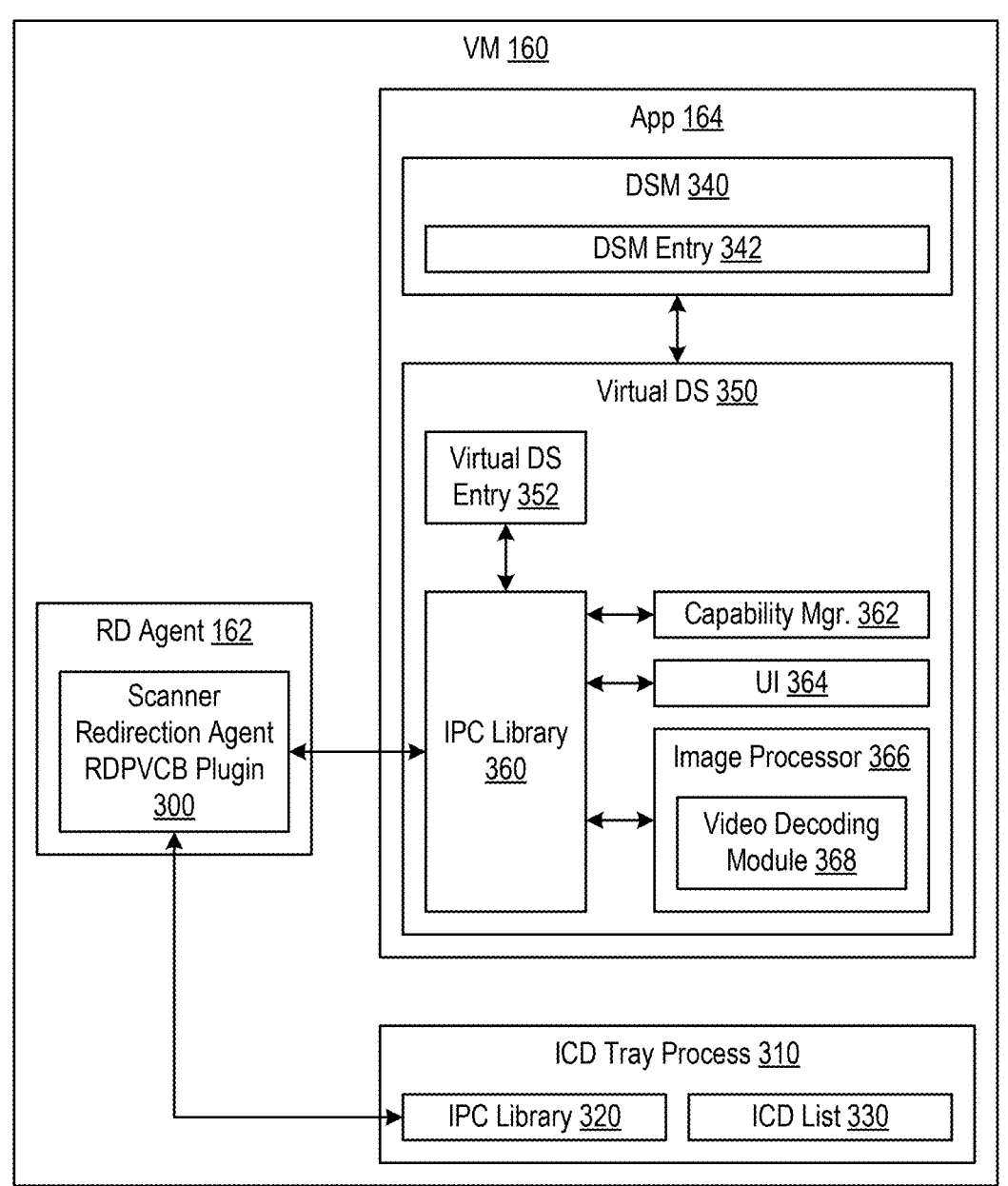
FIG. 3 is a block diagram of a remote virtual machine (VM) of the RD computer system, according to embodiments.

FIG. 3 is a block diagram of VM 160, according to embodiments. RD agent 162 includes a scanner redirection agent RDPVCB plugin 300. Agent RDPVCB plugin 300 is communication software that is configured to communicate with client computer 110 via TCP or UDP channels. Those channels are established between agent RDPVCB plugin 300 and client RDPVCB module 260 of client computer 110 to facilitate communications of the RD session. Agent RDPVCB plugin 300 is also configured to communicate with application 164 and with an ICD tray process 310.

ICD tray process 310 enables the user to select an ICD connected to client computer 110. ICD tray process 310 includes an inter-process communication (IPC) library 320, which facilitates communications (IPCs) with agent RDPVCB plugin 300. ICD tray process 310 also includes an ICD list 330, which lists identifiers (IDs) such as names of ICDs for which drivers have been installed in client computer 110. Such IDs are transmitted by client computer 110 to VM 160, e.g., upon the user logging in to the RD.

For example, to interact with ICD tray process 310, the user may click a toolbar menu item of VM 160, which results in ICD tray process 310 showing the contents of ICD list 330 in an updated RD image. The user may then click on an ID of an ICD to select that ICD for scanner redirection. Upon receiving the user input, RD agent 162 interprets the user input as a user selection of one of the ICDs of ICD list 330. VM 160 then transmits the ID of the selected ICD to scanner redirection client plugin 200. Then, according to the first embodiment for example, scanner redirection client plugin 200 loads the DS corresponding to the selected ICD and establishes a communication session between the DS and the selected ICD.

Application 164 includes a DSM 340 that communicates with a virtual DS 350. Instead of communicating directly with an ICD, virtual DS 350 communicates with client computer 110, e.g., to request images. Specifically, application 164 calls a "DSM entry" function 342 to provide commands to DSM 340. DSM 340 then calls a "virtual DS entry" function 352 to transmit commands to virtual DS 350. Virtual DS 350 also returns results to DSM 340 via return values of virtual DS entry 352 calls. Similarly, DSM 340 returns results via DSM entry 342 return values.

In addition to virtual DS entry 352, virtual DS 350 includes an IPC library 360, a capability manager 362, a user interface (UI) 364, and an image processor 366. IPC library 360 facilitates communications (IPCs) between agent RDPVCB plugin 300, virtual DS entry 352, capability manager 362, UI 364, and image processor 366. Capability manager 362 caches capabilities of various ICDs such as different resolutions those ICDs can acquire images at, the capabilities being received from capability manager 250 of client computer 110. Capability manager 362 transmits those capabilities to UI 364 to be displayed to the user.

Then, via UI 364, the user adjusts various settings such as which resolutions to acquire images at. Capability manager 362 transmits specified adjustments to capability manager 250 of client computer 110 to be applied to a selected ICD. Through UI 364, the user also triggers the acquiring of one or more images by the selected ICD. Virtual DS 350 transmits such requests to client computer 110 via agent RDPVCB plugin 300. Then, virtual DS 350 receives an image or a compressed video file from client computer 110.

Upon receiving a video file, image processor 366 renders the video file to make any images acquired from an ICD useable for application 164. According to embodiments, for a video file, such rendering includes a video decoding module 368 decoding (i.e., expanding) the video file into a decompressed video file. The decompressed video file includes at least approximations of any images acquired from the ICD. Virtual DS 350 returns any images rendered by image processor 366 to DSM 340, which provides the image(s) to application 164.

Figure 4:
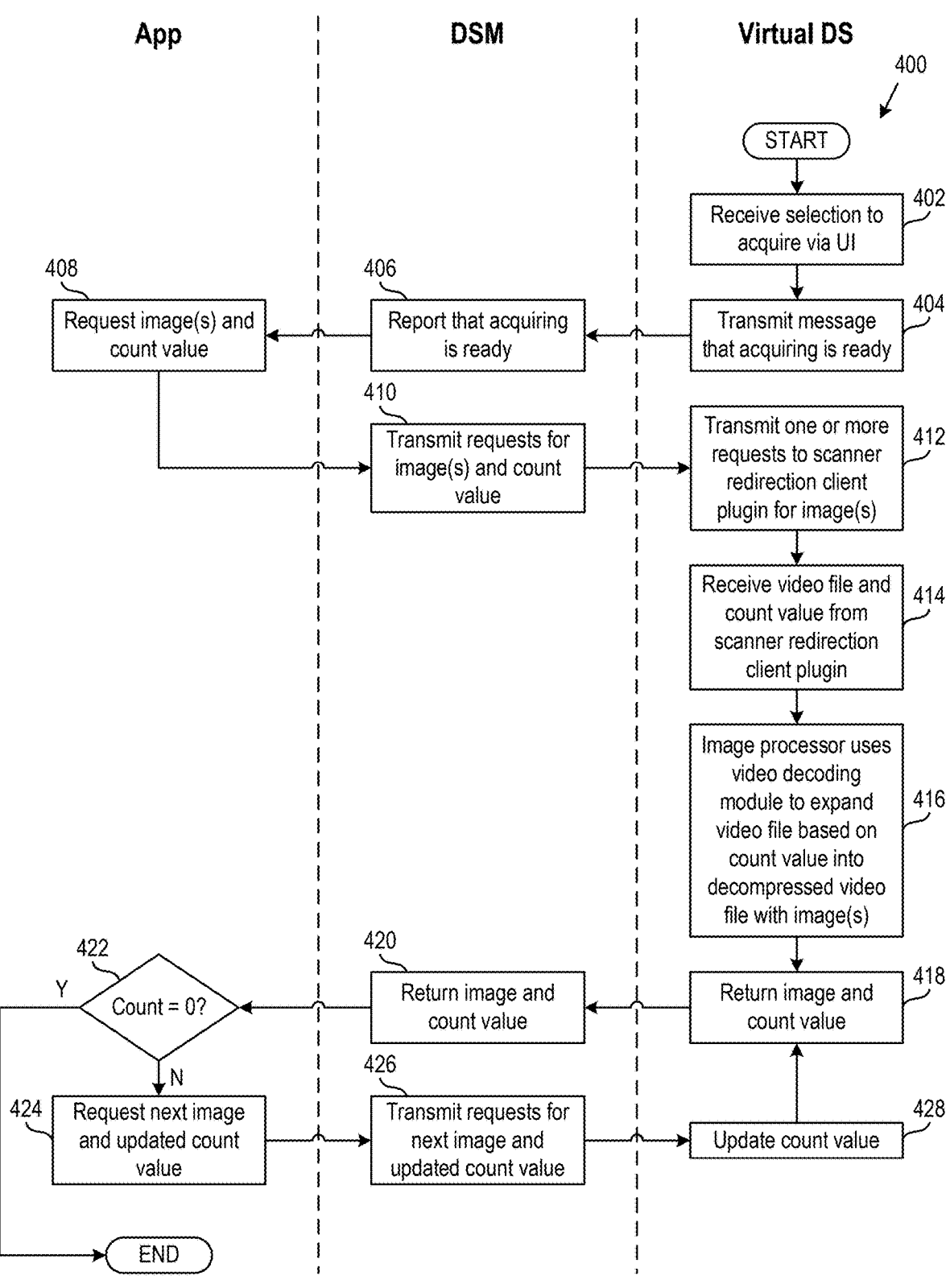
FIG. 4 is a flow diagram of a method performed by the remote VM to acquire one or more images through scanner redirection, according to embodiments.

FIG. 4 is a flow diagram of a method 400 performed by VM 160 to acquire one or more images through scanner redirection, according to embodiments. At step 402, virtual DS 350 receives a selection via UI 364 to acquire the image(s). For example, the user may click an "acquire" button of UI 364 to trigger the selection. At step 404, virtual DS 350 transmits a message to DSM 340 indicating that acquiring is ready. At step 406, DSM 340 reports to application 164 that acquiring is ready.

At step 408, application 164 calls DSM entry 342 to request the image(s) from DSM 340. Application 164 also requests a "count" value, which is a value indicating to application 164 a total amount of images to left to acquire from a selected ICD. At step 410, DSM 340 calls virtual DS entry 352 to transmit requests to virtual DS 350 for the image(s) and count value. At step 412, virtual DS 350 transmits one or more requests for the image(s) and count value to scanner redirection client plugin 200 via a TCP or UDP channel between agent RDPVCB plugin 300 and client RDPVCB module 260. Step 412 triggers the method of FIG. 5, discussed further below. At step 414, virtual DS 350 receives a video file and the count value from scanner redirection client plugin 200 via the TCP or UDP channel.

At step 416, image processor 366 uses video decoding module 368 to decode (expand) the video file into a decompressed video file with one or more images. Video decoding module 368 uses the count value for performing the decompression. As examples, depending on how the video file is compressed, video decoding module 368 may apply H.264 decoding, H.265 decoding, motion JPEG 2000 decoding, or JPEG XS decoding. If the video encoding algorithm used to create the video file was a lossless algorithm, then the decompressed video file includes an exact copy of each image created by an ICD. Otherwise, if the encoding algorithm was lossy, then the decompressed video file includes an approximation of each image.

At step 418, virtual DS 350 transmits an image from the decompressed video file and the count value to DSM 340 as return values of the calls to virtual DS entry 352. At step 420, DSM 340 provides the image and count value to application 164 as return values of the calls to DSM entry 342. At step 422, application 164 checks if the count value is zero. If the count value is nonzero, then application 164 has not yet received all the images from the decompressed video file, and method 400 moves to step 424.

At step 424, application 164 calls DSM entry 342 to request the next image from DSM 340. Application 164 also requests an updated count value, which indicates whether there are any additional images for application 164 to receive from the decompressed video file. At step 426, DSM 340 calls virtual DS entry 352 to transmit requests to virtual DS 350 for the next image and updated count value. At step 428, virtual DS 350 updates the count value, which becomes zero if the next image is the last to provide to application 164.

Method 400 then returns to step 418, and virtual DS 350 transmits the next image from the decompressed video file and the updated count value to DSM 340 as return values of the calls to virtual DS entry 352. Steps 418 to 428 repeat until at step 422, the count value equals zero. The count value equaling zero indicates that application 164 has received all the images from the decompressed video file, and method 400 ends. As mentioned earlier, image transmitter 240 of client computer 110 may optionally use a threshold parameter to determine whether to apply video encoding. If image transmitter 240 transmits a raw (uncompressed) image(s), step 416 is skipped, and virtual DS 350 returns the image(s) one-by-one to application 164 according to steps 418-428.

Figure 5:
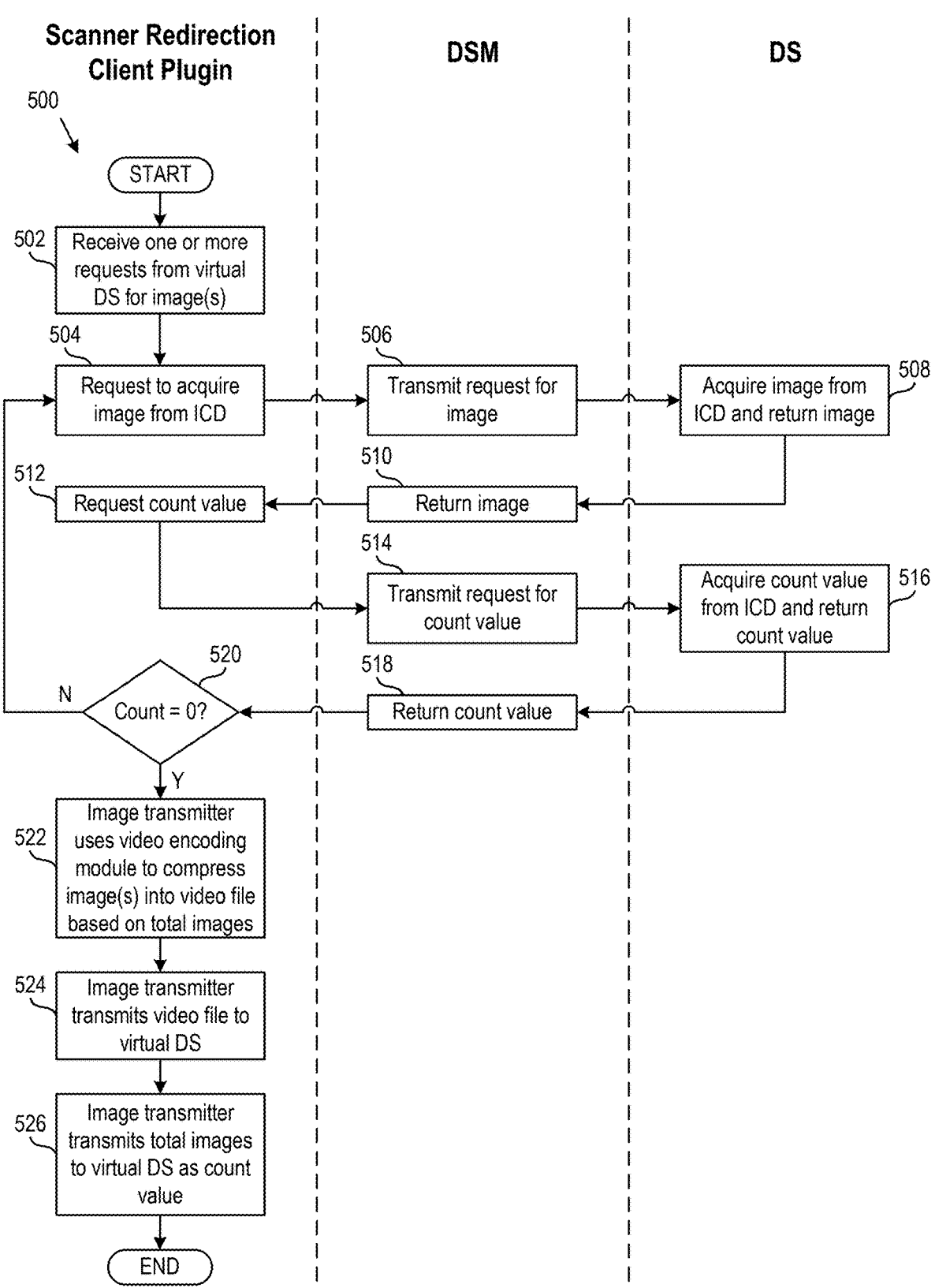
FIG. 5 is a flow diagram of a method performed by the client computer to acquire one or more images for the remote VM, according to the first embodiment.

FIG. 5 is a flow diagram of a method 500 performed by client computer 110 to acquire one or more images for VM 160, according to the first embodiment. At step 502, scanner redirection client plugin 200 receives one or more requests from virtual DS 350 of VM 160 via a TCP or UDP channel between client RDPVCB module 260 and agent RDPVCB plugin 300. The request(s) are to acquire an image(s). At step 504, scanner redirection client plugin 200 calls DSM entry 212 to request DSM 210 to acquire an image. At step 506, DSM 210 calls a DS entry to transmit a request to a DS for the image.

For example, if the user previously selected sheet-fed scanner 130 from ICD tray process 310 of VM 160, DSM 210 calls DS entry 222 to transmit the request to DS 220. In this example, DS 220 has already been loaded by scanner redirection client plugin 200, and DS 220 has already opened a communication session with sheet-fed scanner 130. At step 508, the requested DS communicates with the selected ICD (e.g., according to the TWAIN protocol) to acquire an image therefrom, and transmits the image to DSM 210 as a return value of the call to the DS entry. At step 510, DSM 210 provides the image to scanner redirection client plugin 200 as a return value of the call to DSM entry 212.

At step 512, scanner redirection client plugin 200 calls DSM entry 212 to request DSM 210 for a "count" value. The count value indicates to scanner redirection client plugin 200 whether there are any pending images yet to be acquired from the selected ICD. A count value of zero indicates that there are no pending images. A nonzero value indicates that there is at least one pending image. At step 514, DSM 210 calls the DS entry, e.g., DS entry 222, to transmit a request to the DS, e.g., DS 220, for the count value.

At step 516, the DS acquires the count value from the selected ICD (e.g., sheet-fed scanner 130) and returns the count value to DSM 210 as a return value of the call to the DS entry. At step 518, DSM 210 provides the count value to scanner redirection client plugin 200 as a return value of the call to DSM entry 212. At step 520, scanner redirection client plugin 200 checks if the count value is zero. If the count value is nonzero, method 500 returns to step 504, and scanner redirection client plugin 200 calls DSM entry 212 to request another image from DSM 210, and steps 506-520 repeat. According to embodiments, when there is a plurality of images to be acquired from an ICD, the count value is nonzero on at least the first performance of step 520.

Eventually, upon checking the count value at step 520, when the count value equals zero, method 500 moves to step 522. At step 522, image transmitter 240 uses video encoding module 242 to compress any images acquired at iterations of step 508 into a single video file. Video encoding module 242 uses the total amount of acquired images as a parameter for the video compression. As examples, video encoding module 242 may apply H.264 encoding, H.265 encoding, motion JPEG 2000 encoding, or JPEG XS encoding.

At step 524, image transmitter 240 transmits the video file to virtual DS 350 via the TCP or UDP channel therebetween. At step 526, image transmitter 240 transmits the total images to virtual DS 350 via the TCP or UDP channel therebetween. The total images is to be used by VM 160 as a count value both for decompressing the video file and for providing images to application 164, as discussed above. After step 526, method 500 ends. As mentioned earlier, image transmitter 240 may optionally use a threshold parameter to determine whether to apply video encoding. If image transmitter 240 determines not to apply video encoding, step 522 is skipped, and image transmitter 240 transmits the image(s) acquired from the ICD to virtual DS 350 in the form received from the ICD.

Figure 6:
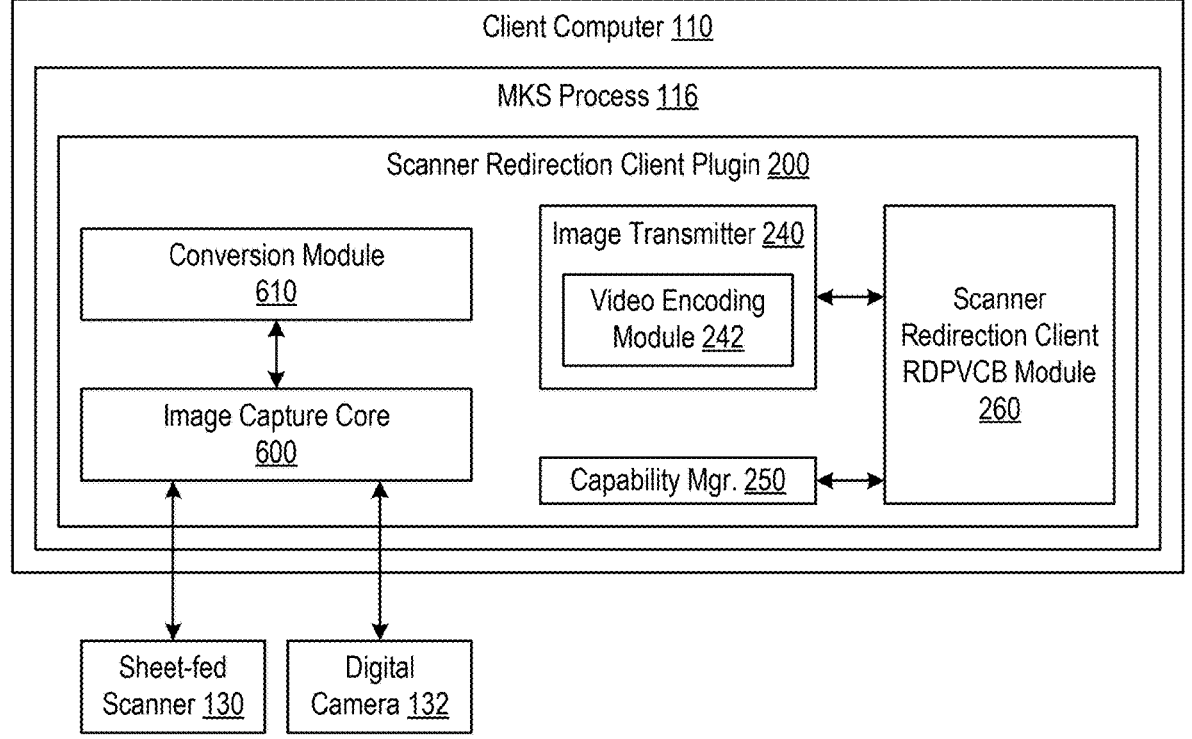
FIG. 6 is a block diagram of the client computer and the group of ICDs connected to the client computer, according to a second embodiment.

FIG. 6 is a block diagram of client computer 110 and ICDs 130 and 132 connected thereto, according to the second embodiment. According to the second embodiment, client computer 110 uses a different scanning protocol (the ICA framework) than that of VM 160. For example, VM 160 may use the TWAIN protocol. As with the example of FIG. 2, in the example of FIG. 6, there are two drivers (not shown) installed for controlling sheet-fed scanner 130 and digital camera 132.

Communication between scanner redirection client plugin 200 and individual components thereof and communication between the individual components, are facilitated via API calls. Like the first embodiment, scanner redirection client plugin 200 includes image capturing software that communicates with ICDs to acquire images therefrom. However, according to the second embodiment, the image capturing software is, e.g., an image capture core 600 instead of one or more DSs. When image capture core 600 acquires one or more images from an ICD according to the ICA framework, scanner redirection client plugin 200 instructs image transmitter 240 to transmit the image(s) to VM 160 via client RDPVCB module 260.

Because scanner redirection client plugin 200 uses its own scanning protocol, scanner redirection client plugin 200 includes a conversion module 610. Conversion module 610 converts data between different scanning protocols. For example, if capability manager 250 receives a request from VM 160 to view capabilities of a particular ICD, then once image capture core 600 acquires those capabilities, conversion module 610 converts the capabilities to the scanning protocol of VM 160. Scanner redirection client plugin 200 then instructs capability manager 250 to transmit them to VM 160. If capability manager 250 receives settings from VM 160 to apply to the ICD, scanner redirection client plugin 200 instructs conversion module 610 to convert the selected settings to the scanning protocol of client computer 110 to be understood by image capture core 600 and applied to the ICD.

According to the second embodiment, scanner redirection client plugin 200 includes image capture core 600 for utilizing the ICA framework. However, client computer 110 may instead use, e.g., the SANE API according to the third embodiment. If using the SANE API, scanner redirection client plugin 200 includes a SANE module that acquires images from sheet-fed scanner 130 and digital camera 132 according to the SANE API. In such embodiment, conversion module 610 converts data between the SANE API and the scanning protocol of VM 160.

Figure 7:
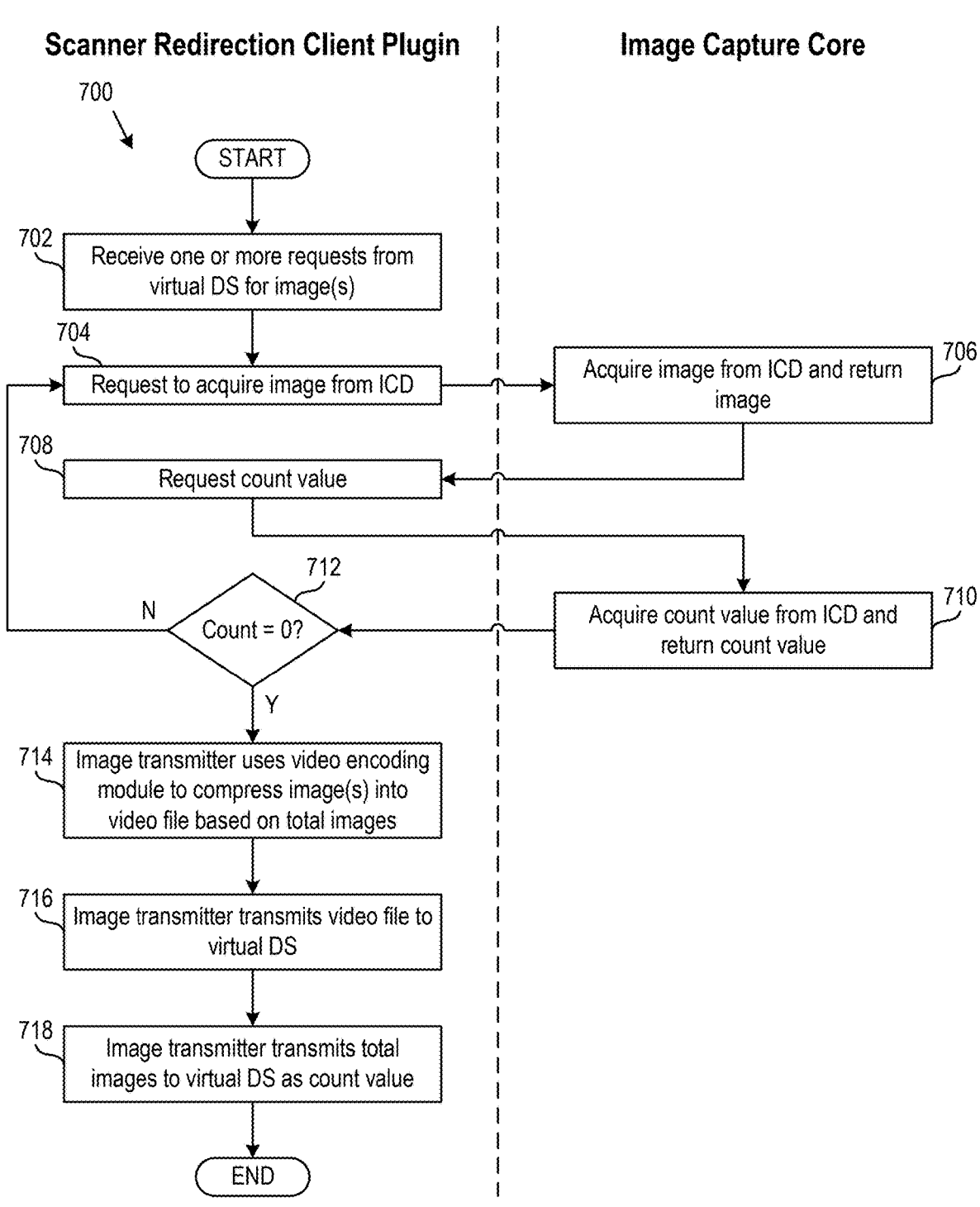
FIG. 7 is a flow diagram of a method performed by the client computer to acquire one or more images for the remote VM, according to the second embodiment.

FIG. 7 is a flow diagram of a method 700 performed by client computer 110 to acquire one or more images for VM 160, according to the second embodiment. At step 702, scanner redirection client plugin 200 receives one or more requests from virtual DS 350 of VM 160 via a TCP or UDP channel between client RDPVCB module 260 and agent RDPVCB plugin 300. The request(s) are to acquire an image(s). At step 704, scanner redirection client plugin 200 requests image capture core 600 to acquire an image from a selected ICD by making an API call to image capture core 600.

For example, if the user previously selected sheet-fed scanner 130 from ICD tray process 310 of VM 160, scanner redirection client plugin 200 has already provided this selection information to image capture core 600. In response to this selection, image capture core 600 has already opened a communication session with sheet-fed scanner 130. At step 706, image capture core 600 communicates with the selected ICD according to the ICA framework to acquire an image therefrom and provides the image to scanner redirection plugin 200 as a return value of the API call. At step 708, scanner redirection client plugin 200 requests image capture core 600 for a "count" value by making another API call to image capture core 600. As mentioned above, the count value indicates to scanner redirection client plugin 200 whether there are any pending images yet to be acquired from the selected ICD.

At step 710, image capture core 600 acquires the count value from the selected ICD, e.g., sheet-fed scanner 130, and provides the count value to scanner redirection client plugin 200 as a return value of the API call. At step 712, scanner redirection client plugin 200 checks if the count value is zero. If the count value is nonzero, method 700 returns to step 704, and scanner redirection client plugin 200 requests image capture core 600 to acquire another image from the selected ICD by making another API call to image capture core 600. Steps 706-712 then repeat. According to embodiments, when there is a plurality of images to be acquired from an ICD, the count value is nonzero on at least the first performance of step 712.

Eventually, upon checking the count value at step 712, when the count value equals zero, method 700 moves to step 714. At step 714, image transmitter 240 uses video encoding module 242 to compress any images acquired at iterations of step 706 into a single video file. Video encoding module 242 uses the total amount of acquired images as a parameter for the video compression. At step 716, image transmitter 240 transmits the video file to virtual DS 350 via the TCP or UDP channel therebetween.

At step 718, image transmitter 240 transmits the total images to virtual DS 350 via the TCP or UDP channel therebetween. The total images is to be used by VM 160 as a count value both for decompressing the video file and for providing the images to application 164, as discussed above. After step 718, method 700 ends. As mentioned earlier, image transmitter 240 may optionally use a threshold parameter to determine whether to apply video encoding. If image transmitter 240 determines not to apply video encoding, step 714 is skipped, and image transmitter 240 transmits the image(s) acquired from the ICD to virtual DS 350 in the form received from the ICD.

It should be noted that image capture core 600 acquires images from ICDs asynchronously. For example, image capture core 600 may acquire multiple images and return them all before scanner redirection client plugin 200 requests the count value at step 708. Additionally, as mentioned above, instead of using the ICA framework, client computer 110 may instead use, e.g., the SANE API according to the third embodiment. For example, if using the SANE API, steps discussed as being performed by image capture core 600 are instead performed by a SANE module that communicates with ICDs according to the SANE API.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, micro-processor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop computer system, wherein the remote desktop computer system includes a client computer and a remote computer, and the client computer is connected to a sheet-fed scanner, the scanner redirection method comprising:

transmitting, by the remote computer to the client computer, at least one request to acquire a plurality of first images from the sheet-fed scanner;

receiving, by the remote computer from the client computer, a compressed video file that was created by the client computer in response to the at least one request, wherein the compressed video file includes data of the first images, which were generated by the sheet-fed scanner;

applying a video decoding algorithm to expand the received compressed video file into a plurality of second images corresponding to the first images; and providing each of the second images to an application running in the remote computer.

2. The scanner redirection method of claim 1, wherein the client computer applies a lossless encoding algorithm to the first images to create the compressed video file, and wherein the second images are exact copies of the first images.

3. The scanner redirection method of claim 1, wherein the client computer applies a lossy encoding algorithm to the first images to create the compressed video file, and wherein the second images are approximations of the first images.

4. The scanner redirection method of claim 1, wherein the video decoding algorithm is one of H.264 decoding, H.265 decoding, motion joint photographic experts group (JPEG) 2000 decoding, and JPEG XS decoding.

5. The scanner redirection method of claim 1, wherein the client computer and remote computer use the TWAIN protocol, and the client computer uses a data source manager and a data source separate from the data source manager to acquire the first images from the sheet-fed scanner.

6. A non-transitory computer-readable medium comprising instructions that are executable in a remote desktop computer system that includes a client computer and a remote computer, wherein the client computer is connected to a sheet-fed scanner, and the instructions when executed cause the remote desktop computer system to carry out a scanner redirection method comprising:

transmitting, by the remote computer to the client computer, at least one request to acquire a plurality of first images from the sheet-fed scanner;

receiving, by the remote computer from the client computer, a compressed video file that was created by the client computer in response to the at least one request, the compressed video file including data of the first images, which were generated by the sheet-fed scanner;

applying a video decoding algorithm to expand the received compressed video file into a plurality of second images corresponding to the first images; and providing each of the second images to an application running in the remote computer.

7. The non-transitory computer-readable medium of claim 6, wherein the client computer applies a lossless encoding algorithm to the first images to create the compressed video file, and wherein the second images are exact copies of the first images.

8. The non-transitory computer-readable medium of claim 6, wherein the client computer applies a lossy encoding algorithm to the first images to create the compressed video file, and wherein the second images are approximations of the first images.

9. The non-transitory computer-readable medium of claim 6, wherein the video decoding algorithm is one of H.264 decoding, H.265 decoding, motion joint photographic experts group (JPEG) 2000 decoding, and JPEG XS decoding.

10. The non-transitory computer-readable medium of claim 6, wherein the client computer and remote computer use the TWAIN protocol, and the client computer uses a data source manager and a data source separate from the data source manager to acquire the first images from the sheet-fed scanner.

11. A remote computer of a remote desktop computer system that comprises a client computer and the remote computer, wherein the client computer is connected to a sheet-fed scanner, and the remote computer is configured to communicate with the client computer via a remote desktop session and further configured to execute on a processor of a hardware platform to:

transmit, to the client computer, at least one request to acquire a plurality of first images from the sheet-fed scanner;

receive, from the client computer, a compressed video file that was created by the client computer in response to the at least one request, wherein the compressed video file includes data of the first images, which were generated by the sheet-fed scanner;

apply a video decoding algorithm to expand the received compressed video file into a plurality of second images corresponding to the first images; and provide each of the second images to an application running in the remote computer.

12. The remote computer of claim 11, wherein the client computer applies a lossless encoding algorithm to the first images to create the compressed video file, and wherein the second images are exact copies of the first images.

13. The remote computer of claim 11, wherein the client computer applies a lossy encoding algorithm to the first images to create the compressed video file, and wherein the second images are approximations of the first images.

14. The remote computer of claim 11, wherein the video decoding algorithm is one of H.264 decoding, H.265 decoding, motion joint photographic experts group (JPEG) 2000 decoding, and JPEG XS decoding.

15. The remote computer of claim 11, wherein the client computer and remote computer use the TWAIN protocol, and the client computer uses a data source manager and a data source separate from the data source manager to acquire the first images from the sheet-fed scanner.

16. The scanner redirection method of claim 1, further comprising:

receiving, by the remote computer from the client computer, a count value indicating a total number of the first images that are encoded into the compressed video file, wherein the video decoding algorithm is applied using the received count value to expand the received compressed video file.

17. The scanner redirection method of claim 1, wherein the client computer accesses a remote desktop running at the remote computer via a remote desktop session between the client computer and the remote computer, the remote computer transmits the at least one request to acquire the first images to the client computer via a network communication channel of the remote desktop session, and the remote computer receives the compressed video file from the client computer via the network communication channel.

18. The non-transitory computer-readable medium of claim 6, wherein the scanner redirection method further comprises:

receiving, by the remote computer from the client computer, a count value indicating a total number of the first images that are encoded into the compressed video file, wherein the video decoding algorithm is applied using the received count value to expand the received compressed video file.

19. The non-transitory computer-readable medium of claim 6, wherein the client computer accesses a remote desktop running at the remote computer via a remote desktop session between the client computer and the remote computer, the remote computer transmits the at least one request to acquire the first images to the client computer via a network communication channel of the remote desktop session, and the remote computer receives the compressed video file from the client computer via the network communication channel.

20. The remote computer of claim 11, further configured to execute on the processor of the hardware platform to:

receive, from the client computer, a count value indicating a total number of the first images that are encoded into the compressed video file, wherein the video decoding algorithm is applied using the received count value to expand the received compressed video file.

* * * * *